US012169062B2

(12) United States Patent
Dickie

(10) Patent No.: US 12,169,062 B2
(45) Date of Patent: Dec. 17, 2024

(54) ROPE LIGHT DEVICES WITH STORAGE SPOOL

(71) Applicant: Brightz, Ltd., Ottawa Lake, MI (US)

(72) Inventor: Samantha Dickie, Canton, MI (US)

(73) Assignee: Brightz, Ltd., Ottawa Lake, MI (US)

( * ) Notice: Subject to any disclaimer, the term of this patent is extended or adjusted under 35 U.S.C. 154(b) by 0 days.

(21) Appl. No.: 18/134,716

(22) Filed: Apr. 14, 2023

(65) Prior Publication Data

US 2023/0332765 A1 Oct. 19, 2023

Related U.S. Application Data

(60) Provisional application No. 63/331,425, filed on Apr. 15, 2022.

(51) Int. Cl.

| | |
|---|---|
| ***F21V 27/00*** | (2006.01) |
| ***F21S 4/26*** | (2016.01) |
| ***F21V 21/08*** | (2006.01) |
| ***F21V 23/04*** | (2006.01) |

(52) U.S. Cl.

CPC ................ *F21V 27/00* (2013.01); *F21S 4/26* (2016.01); *F21V 21/08* (2013.01); *F21V 23/04* (2013.01)

(58) Field of Classification Search

CPC ...... F21S 4/26; F21V 21/0885; F21V 27/005; B65H 75/40; B65H 75/34

See application file for complete search history.

(56) References Cited

U.S. PATENT DOCUMENTS 4,559,677 A * 12/1985 Tracy .................... F16B 45/008 24/700
5,317,788 A * 6/1994 Esposito ............... F16B 45/008 24/300
5,546,639 A * 8/1996 Lacore .................... F16G 11/02 24/136 L
5,638,584 A * 6/1997 De Anfrasio ......... F16B 45/008 24/598.5
5,661,953 A * 9/1997 Jolley ..................... B65B 63/04 242/395
5,695,148 A * 12/1997 Christensen ........... B65H 75/18 242/405.3
5,957,401 A * 9/1999 O'Donnell ........... B65H 75/406 242/402
6,014,794 A * 1/2000 McCoy ...................... B62J 7/08 24/68 CD
6,094,784 A * 8/2000 Schrader ............... F16B 45/008 24/598.5

(Continued)

*Primary Examiner* — Ismael Negron
(74) *Attorney, Agent, or Firm* — Dinsmore & Shohl LLP

(57) ABSTRACT

An illumination device includes a spool body having a top flange extending from a perimeter of a first end of the spool body and a bottom flange extending from the perimeter of a second end of the spool body opposite the first end of the spool body, a rope light selectively wrapped around the spool body, and a power source disposed with the spool body and electrically coupled to the rope light such that the power source causes the rope light to emit light. An end of the rope light may be secured to the spool body and a second send of the rope light may include an attachment device for attaching the rope light to a rope or like support. Circuitry components may be configured to electrically couple the power source to the rope light and control an illumination mode of the rope light.

17 Claims, 12 Drawing Sheets

(56) References Cited

U.S. PATENT DOCUMENTS

| | | | | |
|---|---|---|---|---|
| 6,299,095 B1 * | 10/2001 | Murfin | B65H 75/40 | 242/405 |
| 6,398,148 B1 * | 6/2002 | Snow | B65H 75/40 | 242/395.1 |
| 6,497,381 B2 * | 12/2002 | Rose | B65H 75/40 | 242/402 |
| 6,758,314 B2 * | 7/2004 | Woodruff | B65H 75/40 | 242/395 |
| 6,851,163 B2 * | 2/2005 | Selby | F16B 45/008 | 24/537 |
| 6,902,130 B1 * | 6/2005 | Salem | B65H 75/40 | 242/395 |
| 7,181,809 B1 * | 2/2007 | Kuo | F16B 45/00 | 24/265 H |
| 7,318,561 B1 * | 1/2008 | Giampietro | B65H 75/14 | 242/402 |
| 7,540,070 B1 * | 6/2009 | Selby | F16B 45/012 | 24/265 H |
| 7,712,195 B1 * | 5/2010 | Selby | F16G 11/00 | 24/301 |
| 8,371,001 B2 * | 2/2013 | Vass | B60P 7/0823 | 24/301 |
| 11,280,386 B1 * | 3/2022 | Cornay | F16B 45/00 | |
| 11,408,568 B2 * | 8/2022 | Wu | F21V 21/08 | |
| 11,732,849 B1 * | 8/2023 | Tagle | G08B 5/006 | 362/249.01 |
| 11,827,138 B1 * | 11/2023 | Hoch | B60P 7/0823 | |
| 2019/0143889 A1 * | 5/2019 | Kelly | B65H 75/40 | 340/903 |
| 2022/0340393 A1 * | 10/2022 | Nyfelt | B65H 75/48 | |

* cited by examiner

ROPE LIGHT DEVICES WITH STORAGE SPOOL

CROSS-REFERENCE TO RELATED APPLICATION

This application claims priority to U.S. Provisional Application No. 63/331,425 filed Apr. 15, 2022, the disclosure of which is incorporated herein by reference in its entirety.

TECHNICAL FIELD

The present specification relates to illumination devices, and more specifically to spooled illumination devices having an LED paracord illumination source.

BACKGROUND

Flashlights and similar illumination devices are commonly used for outdoor activities such as camping or the like to illuminate the outdoor environment.

SUMMARY

In one embodiment, an illumination device includes a spool body, a rope light selectively wrapped around the spool body, and a power source disposed with the spool body and electrically coupled to the rope light such that the power source causes the rope light to emit light.

In another embodiment, an illumination device includes a rope light comprising a plurality of illumination sources woven into a rope material of the rope light, a spool body comprising a top flange extending from a perimeter of a first end of the spool body and a bottom flange extending from a perimeter of a second end of the spool body opposite the first end of the spool body, wherein the rope light is selectively spooled around the spool body between the top flange and the bottom flange, a plurality of slots disposed with the top flange and the bottom flange, the plurality of slots configured to receive and retain a portion of rope light, and a power source disposed with the spool body and electrically coupled to the rope light such that the power source causes the rope light to emit light.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals.

DETAILED DESCRIPTION

References will now be made in detail to the embodiments of the disclosure, examples of which are illustrated in the accompanying drawings. Whenever possible, like reference numbers will be used to refer to like components or parts.

Embodiments described herein are directed to spooled illumination devices having an LED paracord illumination source. The spooled illumination devices include a rope like light device which may be strung out across an area to illuminate. For example, the LED paracord illumination source, which will be referred to herein as a rope light, may be coiled up around a spool portion of the spooled illumination device for storage. When coiled up around the spool portion of the spooled illumination device the rope light may turned on and provide light, for example, like a lantern. Additionally, a length of the rope light may be unwrapped from the spool and strung out across a space. That is, the spool end of the spooled illumination device may be attached to a first object, for example, a tree by way of a carabineer, strap, or other attachment means connected to the body of the spooled illumination device. The end of the length of the rope light unwrapped from the spool may be attached to a second object by way of a hook device fixed to an end of the rope light. In this way a string of lights incorporated within the rope light may illuminate an area that the rope light extends across.

Illumination devices described herein may be used to illuminate a campsite, add color and illumination to hammocks or tents, or provide patio or picnic table illumination, or the like. The potential uses for such an illumination device are further extended because the illumination devices described herein are battery operated, thus no external power source is needed, and are easily transported because they neatly store the rope light.

The following will now describe embodiments of illumination devices in detail with reference to the figures.

Figure 1:
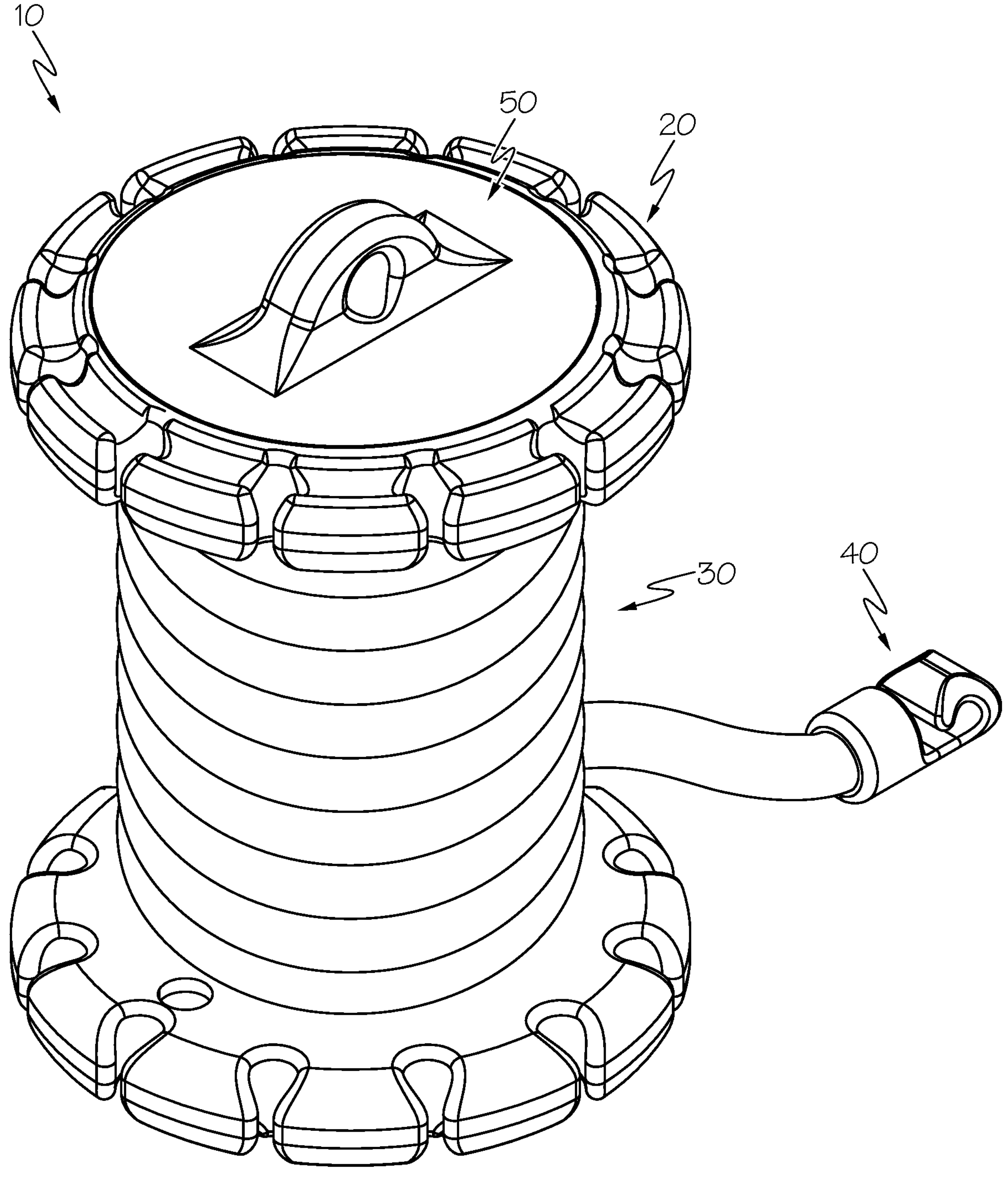
FIG. 1 depicts an illustrative embodiment of a first spooled illumination device, according to one or more embodiments shown and described herein.
Figure 10:
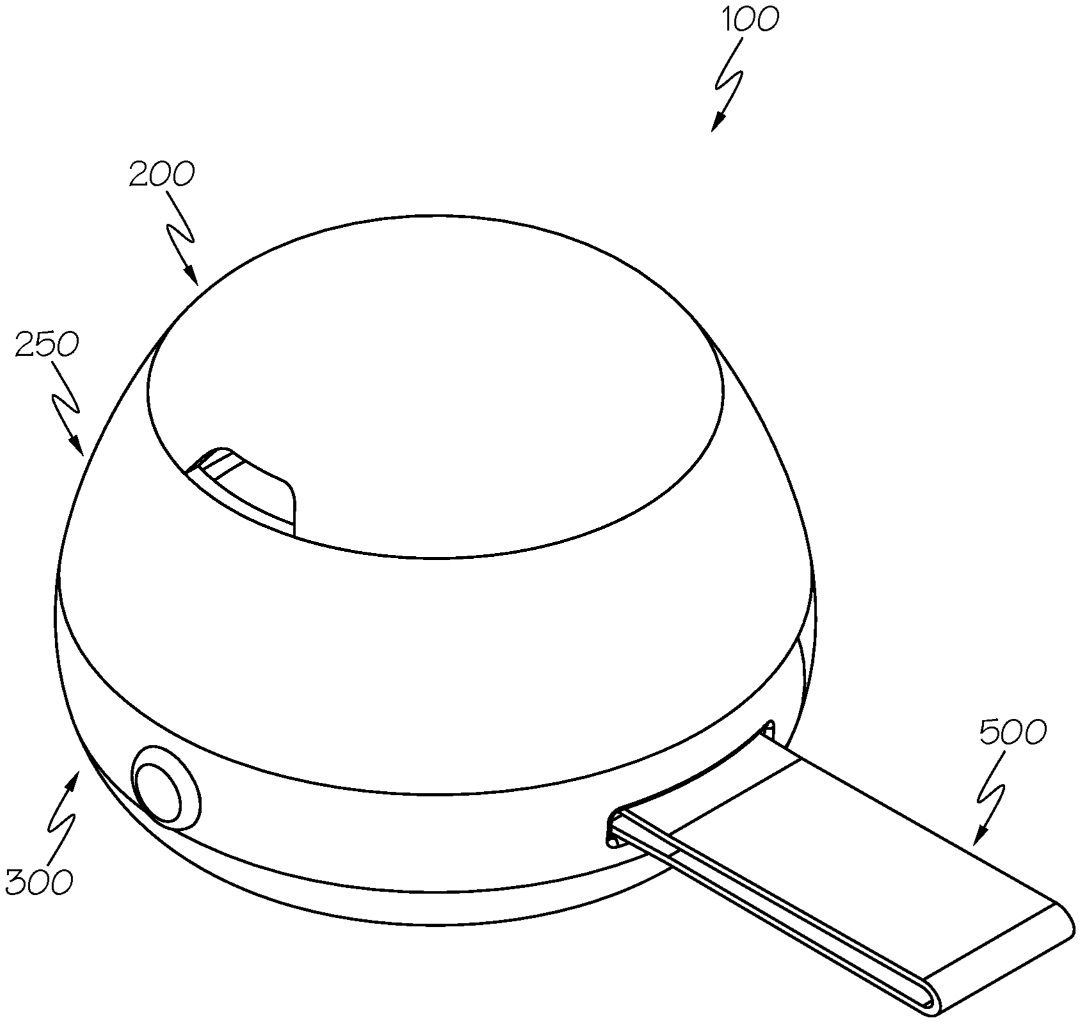
FIG. 10 depicts an illustrative embodiment of a second spooled illumination device, according to one or more embodiments shown and described herein.

FIG. 1 depicts an illustrative embodiment of a first spooled illumination device 10. FIG. 10, which will be discussed in more detail herein, depicts an illustrative embodiment of a second spooled illumination device 100. It should be understood that various aesthetic designs of a spooled illumination device may be contemplated within the scope of the structures and functions of the spooled illumination devices described herein.

Figure 2:
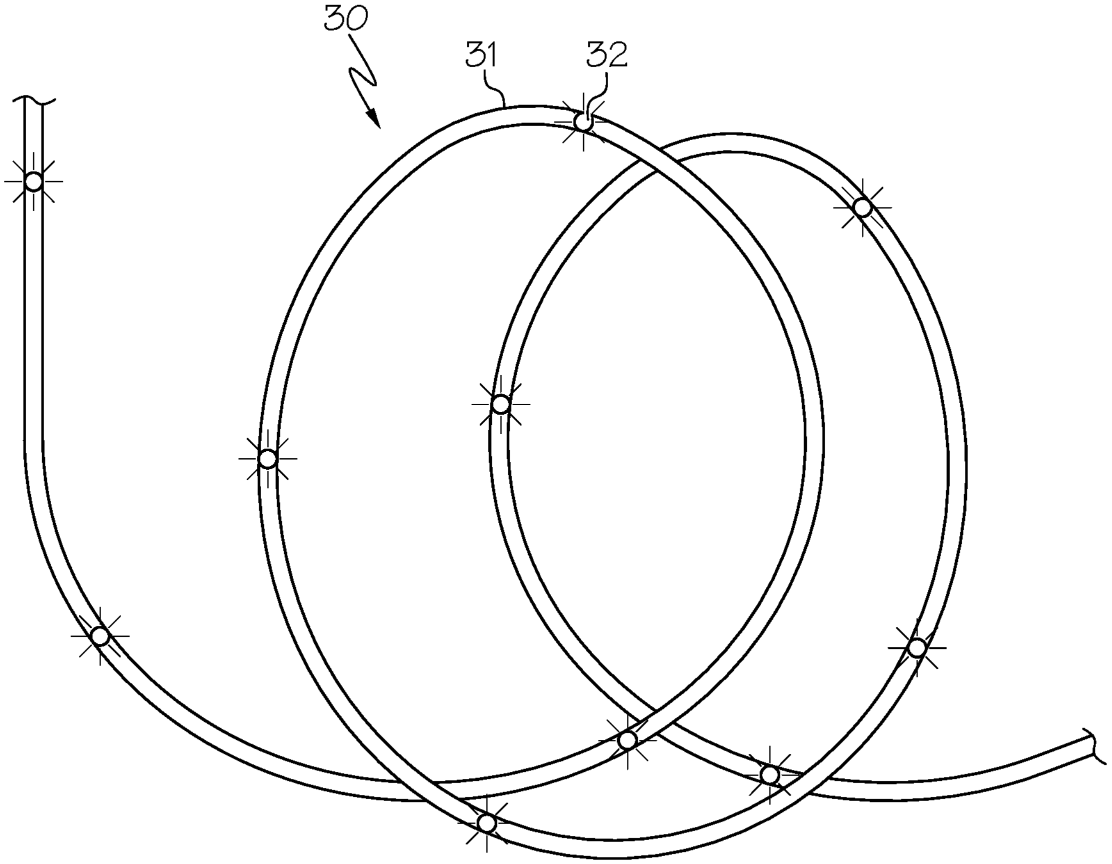
FIG. 2 depicts an illustrative LED paracord illumination source, according to one or more embodiments shown and described herein.

Referring to FIGS. 1-9, the first spooled illumination device 10 will now be described. The spooled illumination device 10 includes a spool 20, a length of rope light 30, an attachment device 40 fixed to a loose end of the rope light 30, and a fixation component 50. FIG. 1 depicts the rope light 30 wrapped around the spool 20 of the illumination device 10. FIG. 2 depicts an illustrative example of a length of rope light 30 that is activated. The rope light 30 may be a paracord or other rope light material having multiple illumination sources 32 such as LEDs or other illumination devices woven into or enclosed within the length 31 of the rope light 30. In some embodiments, one or more strand of illuminating optical fiber may be woven into or embedded with the core of the length 31 of rope material. Wires may connect each of the multiple illumination sources 32 to a power source within the spool 20 of the illumination device 10. The rope light 30 is flexible and may be made of a durable material. In some embodiments, the rope light 30 may be washable. The illumination device 10 may be weather and/or water resistant. Each of the multiple illumination sources 32 may be spaced apart with equal or near equal spacing. For example, the LEDs 32 may be spaced every 5 cm, 10 cm, 15 cm, 20 cm, 25 cm, 30 cm or anywhere between 5 cm and 30 cm apart. The length 31 of the rope light 30 may have a total length of about 5 ft. to about 50 ft., or about 5 ft., 10 ft., 15 ft., 20 ft., 25 ft., 30 ft., 35 ft., 40 ft., 45 ft., or 50 ft.

A circuitry component that connects the rope light 30 to the power source and switch controls the operation of the rope light 30. The circuitry component may be configured to generate multiple modes of illumination. Modes of illumination may include high brightness, medium brightness, low brightness, and/or a flashing mode. The brightness may change my change the power delivered to the light illuminating devices. For example, the light emitting devices may provide 75 lumens, 100 lumens, 150 lumens, 200 lumens, or any level between 75 and 200 lumens. Each brightness mode may be configured to provide a different lumen level. Modes of illumination may also include changing the color of the light emitted. In some embodiments, the multiple illumination sources 32 may be configured cycle or morph from a first color to a second color. As used herein, the term morph refers to a gradual transition from one color or brightness to another. The multiple illumination sources 32 may include white LEDs and/or RGBW LEDs.

Figure 3:
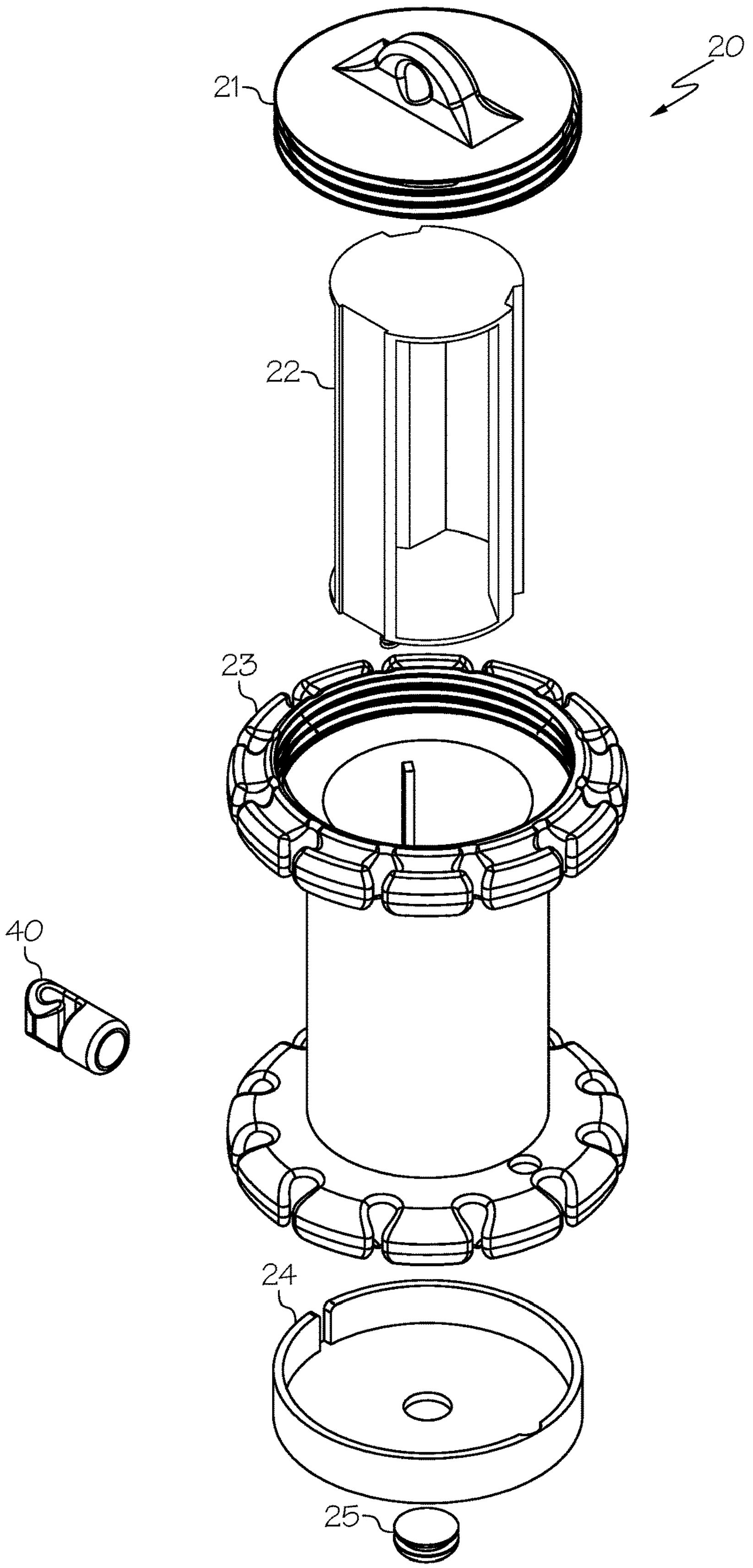
FIG. 3 depicts an exploded component view of the first spooled illumination device, according to one or more embodiments shown and described herein.
Figure 4:
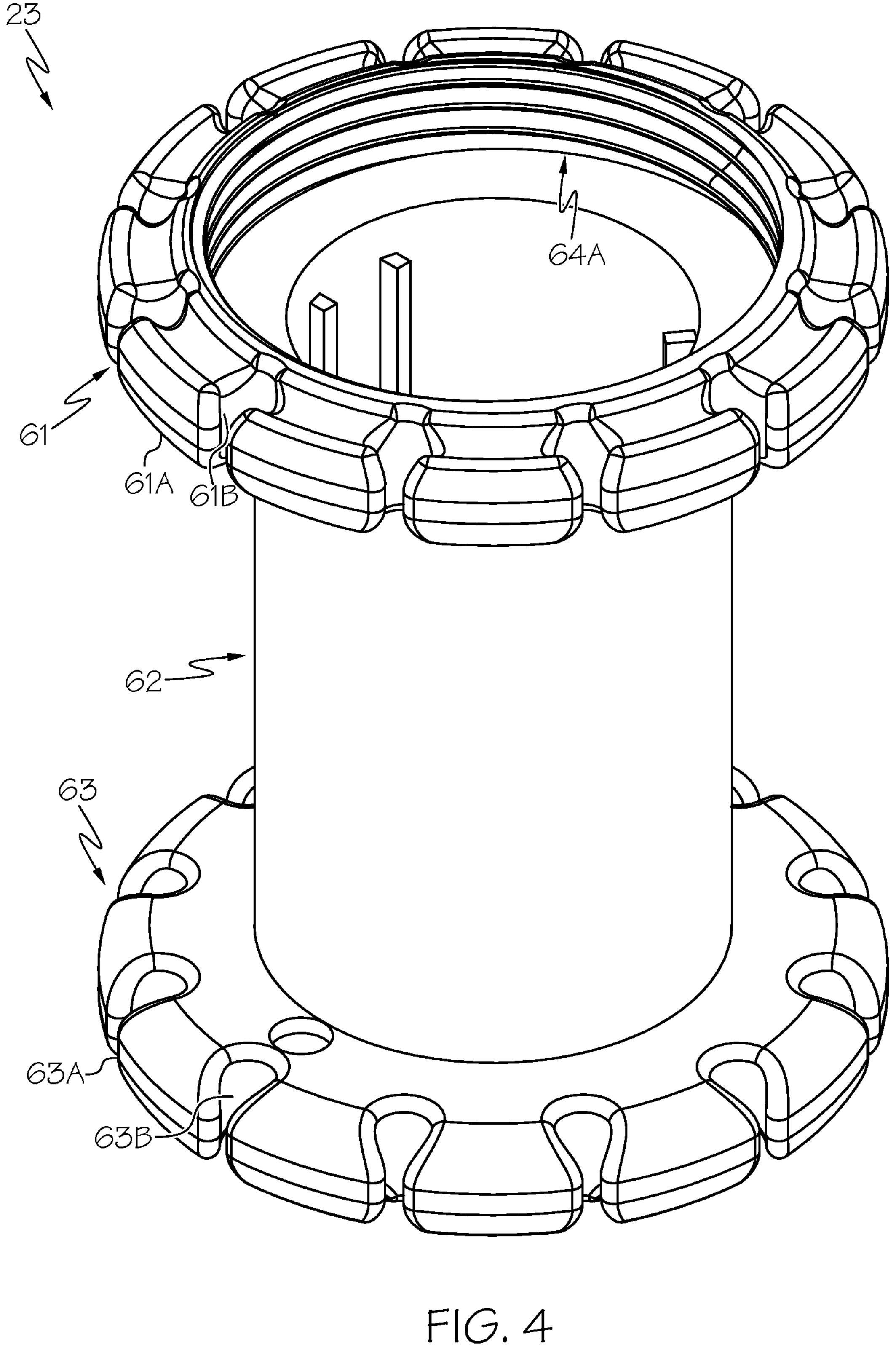
FIG. 4 depicts a perspective view a spool component of the first illumination device, according to one or more embodiments shown and described herein.
Figure 5:
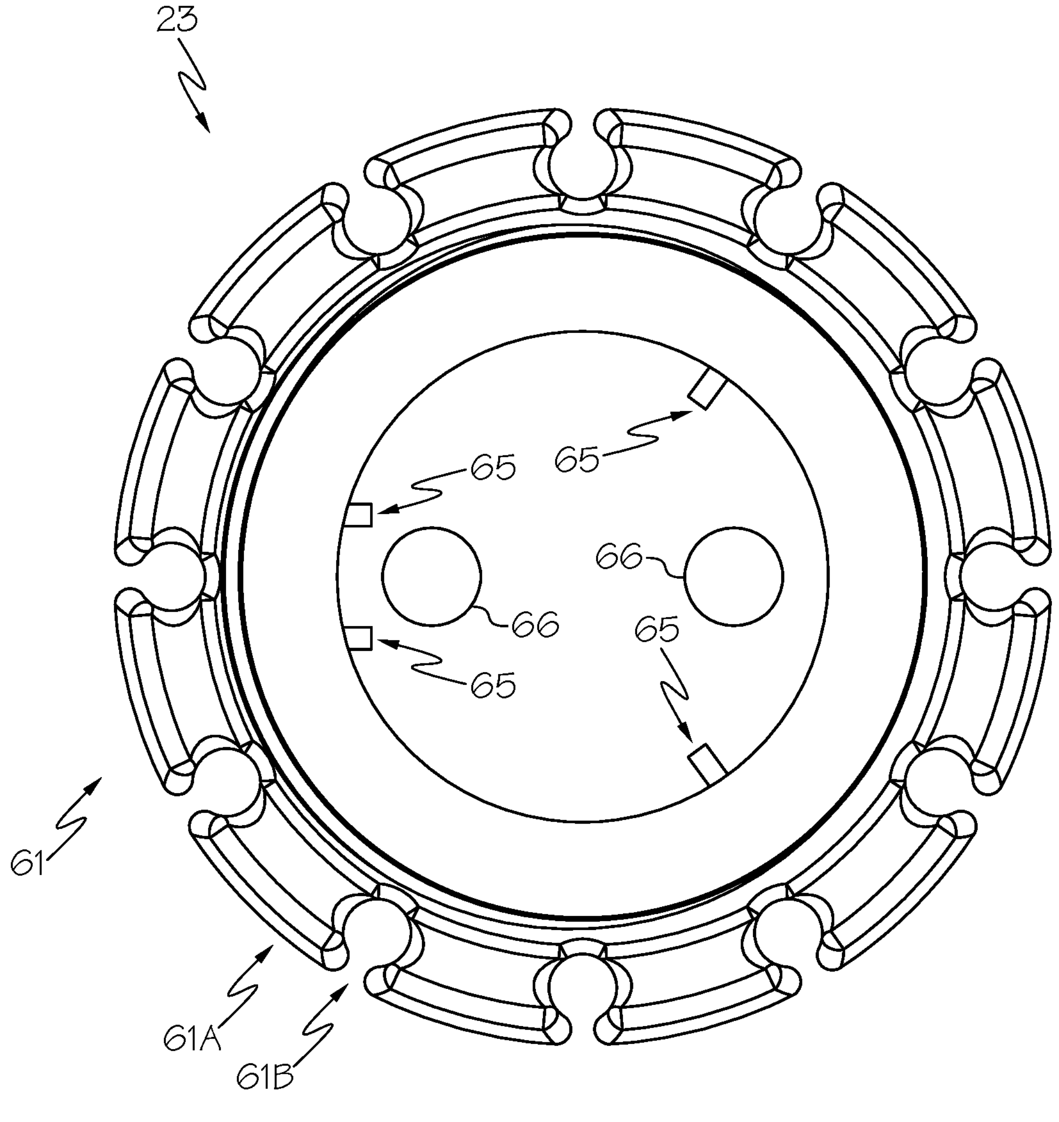
FIG. 5 depicts a top view the spool component of the first illumination device, according to one or more embodiments shown and described herein.
Figure 6:
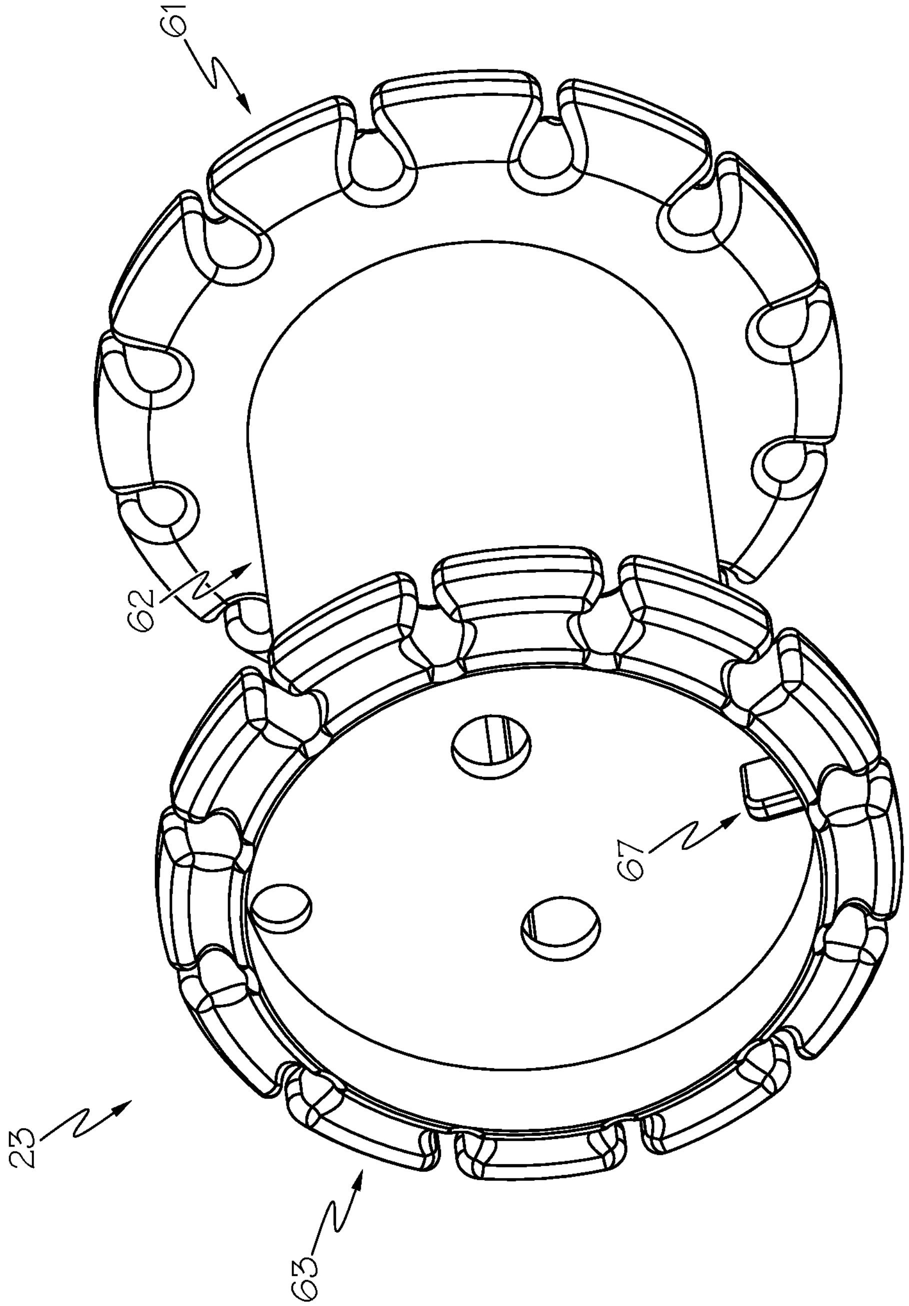
FIG. 6 depicts a bottom perspective view the spool component of the first illumination device, according to one or more embodiments shown and described herein.
Figure 7:
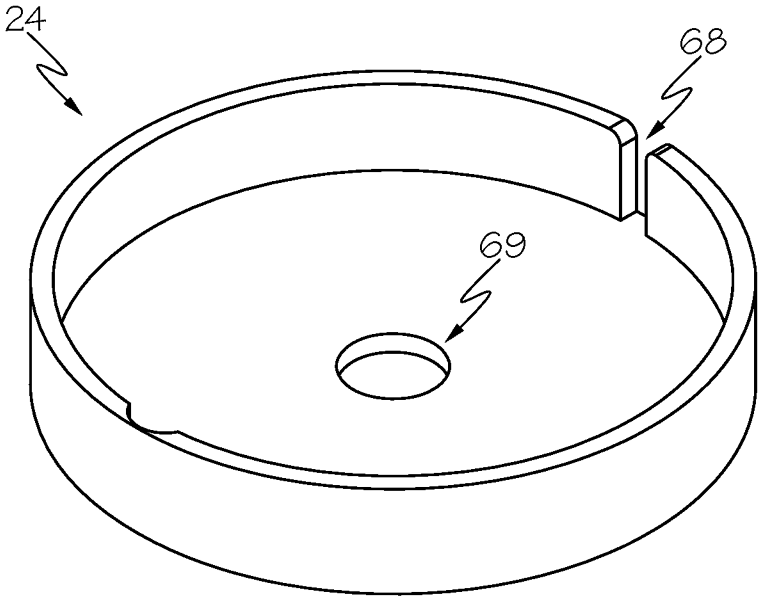
FIG. 7 depicts an illustrative end cap of the spool component of the first illumination device, according to one or more embodiments shown and described herein.

Turning to FIG. 3, an exploded component view of the first spooled illumination device 10 is depicted. The spool 20 comprises several components. The spool 20 includes a threaded cap 21, a battery holder 22, a spool body 23, an end cap 24, a button cover 25 and an attachment device 40. The threaded cap 21, the battery holder 22, the spool body 23, the end cap 24, and the attachment device 40 may be made of a plastic material such as ABS or other similar durable material. The button cover 25 may be made of silicone or another flexible material. In some embodiments, the button cover 25 may also be a plastic material and coupled to the end cap 24 in an actuatable manner such as through a spring or other flexible component. FIGS. 4-6 provide additional views of the spool body 23 and will now be described in more detail. The spool body 23 of the first spooled illumination device 10 has a cylindrical shape that is open one each end. A top flange 61 extends from a perimeter of a first end of the spool body 23. A bottom flange extends from a perimeter of a second end of the spool body 23. The first end and the second end of the spool body 23 are connected by a barrel portion 62. The barrel portion 62 receives wrappings of the rope light 30 for storage.

Referring specifically to FIG. 4, within the perimeter of the first end of the spool body 23 opposite the top flange 61, a number of threads 64A are disposed. The threads 64A are configured to receive mating threads 64B of the threaded cap 21 depicted in more detail in FIG. 9. As depicted in FIG. 5, which is a top-down view of the spool body 23, extending past the threads 64A into the spool body 23, one or more locating or alignment features 65 are formed on with the inner wall of the spool body 23. The one or more locating or alignment features 65 assure that the battery holder 22 may be inserted correctly into the spool body 23 and is securely located therein. The threaded cap 21 is screwed into the threads 64A of the spool body 23 enclosing the battery holder 22 within the spool body.

Referring again to FIG. 4, the top flange 61 and the bottom flange 63 include a series of posts 61A, 63A and slots 61B, 63B formed between a pair of posts 61A, 63A, respectively. The series of posts 61A, 63A and slots 61B, 63B are positioned around the perimeter of the spool body 23. The slots 61B, 63B are sized and shaped to receive a segment of the rope light 30. When a segment of the rope light 30 is placed within the one of the slots 61B, 63B, the slot 61B, 63B, and the adjacent pair of posts 61A, 63A secure the rope light 30 such that further lengths of rope light 30 will not unwrap from the barrel portion 62 until the segment is removed from the slot 61B, 63B.

Turning to FIG. 6, a bottom perspective view of the spool body 23 is depicted. The second end of the spool body 23 provides a cavity where a printed circuit board having electronic components for controlling the illumination of the rope light 30 is housed. A locating feature 67 may be provided within the inner wall of the spool body 23 opposite the bottom flange 63. The locating feature 67 provides a guide for connecting the end cap 24 to the spool body 23. The end cap 24, which is depicted in detail in FIG. 7, includes a cutout 68 that corresponds to the locating feature 67 on the spool body 23. Additionally, the end cap includes a hole 69 where the button cover 25 is attached so that the button cover 25 aligns with the switch or button disposed on the printed circuit board housed within the end cap 24 and the bottom of the spool body 23. The end cap 24 may be attached to the spool body 23 with an adhesive, through a welding process such as ultrasonic welding of plastic component, through screws or other fastening means.

Figure 8:
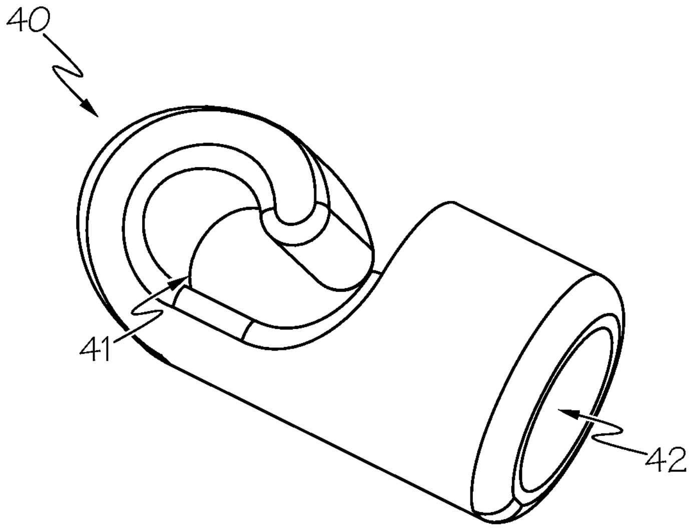
FIG. 8 depicts an illustrative hook for LED paracord illumination source of the first illumination device, according to one or more embodiments shown and described herein.
Figure 9:
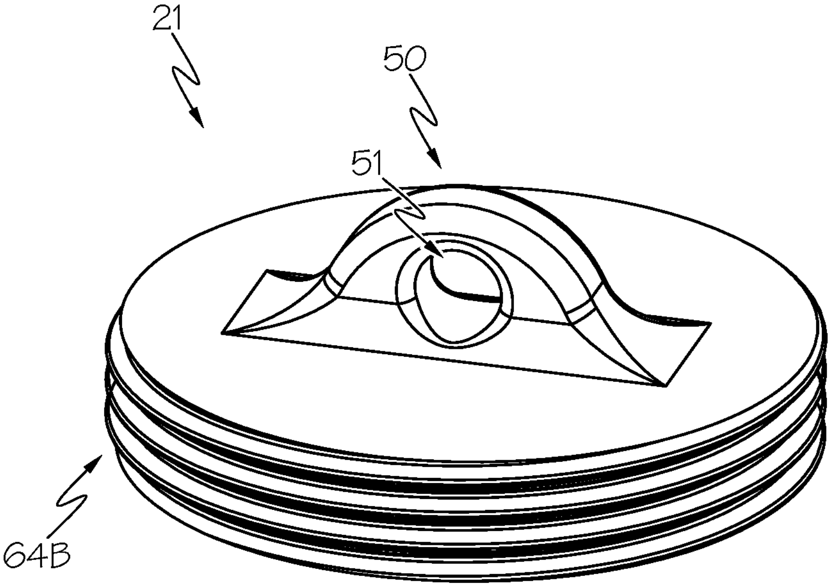
FIG. 9 depicts an illustrative threaded cap to the spool component of the first illumination device, according to one or more embodiments shown and described herein.

FIG. 8 depicts an illustrative embodiment of the attachment means 40. The attachment means 40 includes a hook 41 or similar feature such as an eyebolt or the like. The hook 41 enables the attachment means 40 to couple to a rope, strap, a bungie cord, a length 31 of the rope light 30 or the like. The rope light 30 may be connected to the hook 41 within a receiving section 42. A loose end of the rope light 30, that is, the end not connected to spool body 23 and the power source, is fitted within the receiving section 42. It may be press fit, glued or otherwise secured therein. For example, a length of the loose end of the rope light 30 may be wrapped around a tree or post and the hook 41 may be doubled back and coupled to a segment of the rope light 30 thereby connecting an end of the rope light 30 to the tree. The spool body 23, that is connected to the other end of the rope light 30 and optionally having one or more wraps of rope light 30 wrapped around the barrel portion 62 may be connected to another tree, post, eyebolt or the like such that the rope light 30 is suspended between the two objects. The spool body 23 may be connected to the second object via a carabineer connected to the threaded cap 21. As shown in FIG. 9, the threaded cap 21 includes an attachment means 50 having a hole 51 integrally formed with the threaded cap 21. The hole 51 may be used to receive a carabineer, a rope, or other device used for connecting the illumination device 10 to an object.

In view of the foregoing description, it should be understood that an embodiment of the spooled illumination device 10 is a device configured to store a length of rope light 30 which may be selectively unwrapped and suspended between two points with the spool body being anchored to one object or point and a loose end of the rope light 30 connected to a second object or point via an attachment means 40. The spooled illumination device 10 includes a power source, which may be disposable batteries (e.g., one or more primary batteries) held in a battery holder 22 within the spool body 23 or a rechargeable battery.

Turning to FIGS. 10-13 an illustrative embodiment of a second spooled illumination device 100 is depicted and will now be described. The second spooled illumination device 100 is similar to the first spooled illumination device 10, however, has a different structure design. The most apparent difference is that the second spooled illumination device 100 encloses the rope light 30 around a spool 255 (FIG. 12) within a housing. The housing includes a top 200, a shell 250 and a bottom portion 300. An attachment means 500 which may be a cloth strap is coupled to the bottom portion 300 and extends therefrom.

Figure 11:
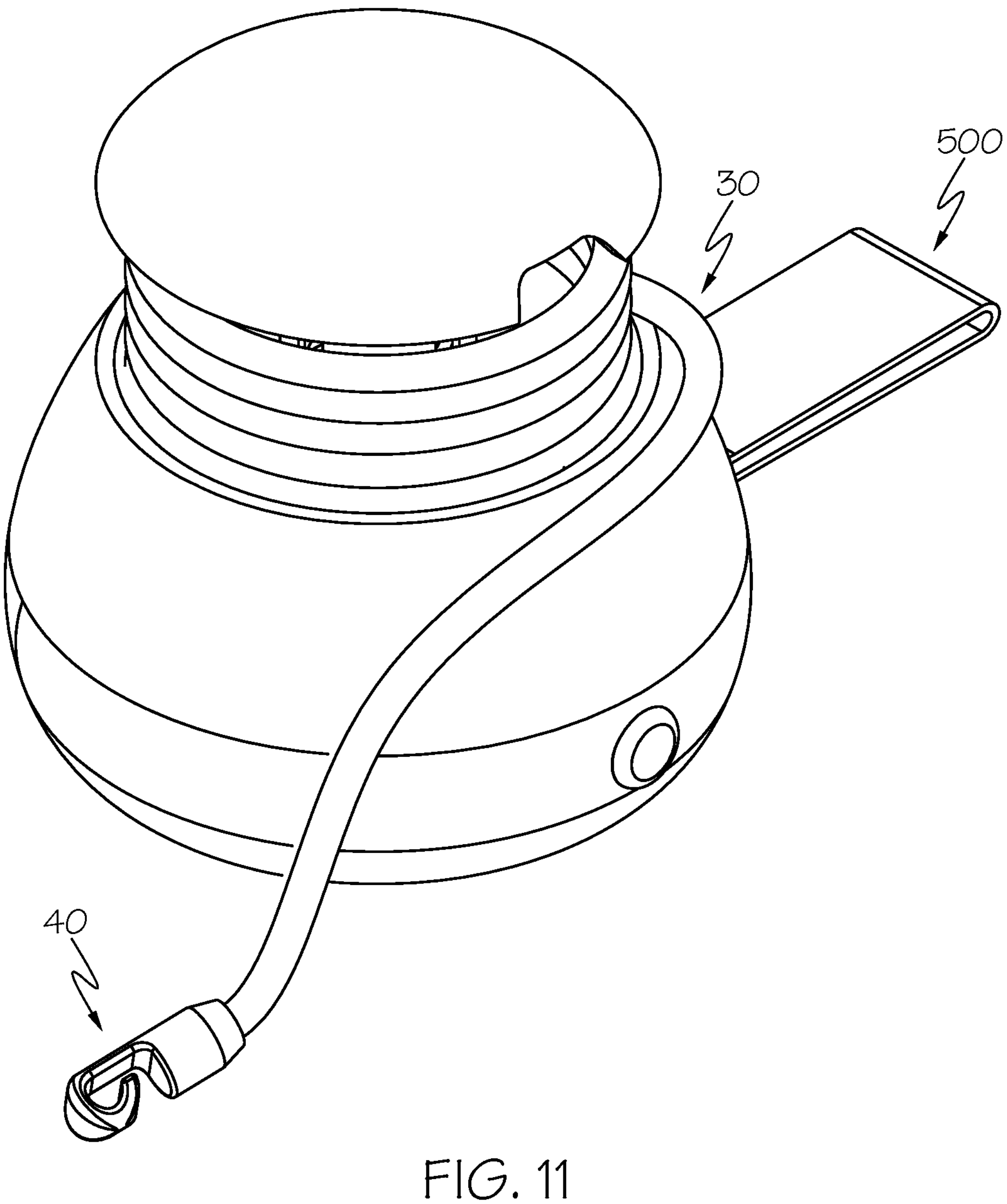
FIG. 11 depicts another illustrative view of the second spooled illumination device, according to one or more embodiments shown and described herein.

The shell 250 and the bottom portion 300 may be fasten together. The bottom portion 300 may be opaque, while the shell 250 may be transparent or semi-transparent (e.g. diffused). For example, the shell 250 may act as a lens for the rope light 30 that is stored and activated within the housing of the second spooled illumination device 100. The top 200 may also be transparent or semi-transparent (e.g. diffused) and operate as a lens. The top 200 is not fastened to the shell 250. Rather, the top 200 may be separated from the shell 250 by a predefined distance so that the rope light 30 stored therein may be extracted or returned to the spool 255 within the housing of the second spooled illumination device 100. FIG. 11 depicts an example where the top 200 is separated from the shell 250. When the top 200 is lifted, the spool 255 that is disposed within the housing of the second spooled illumination device 100 may also rise from within the housing so that the rope light 30 may be more directly unwrapped therefrom.

Figure 12:
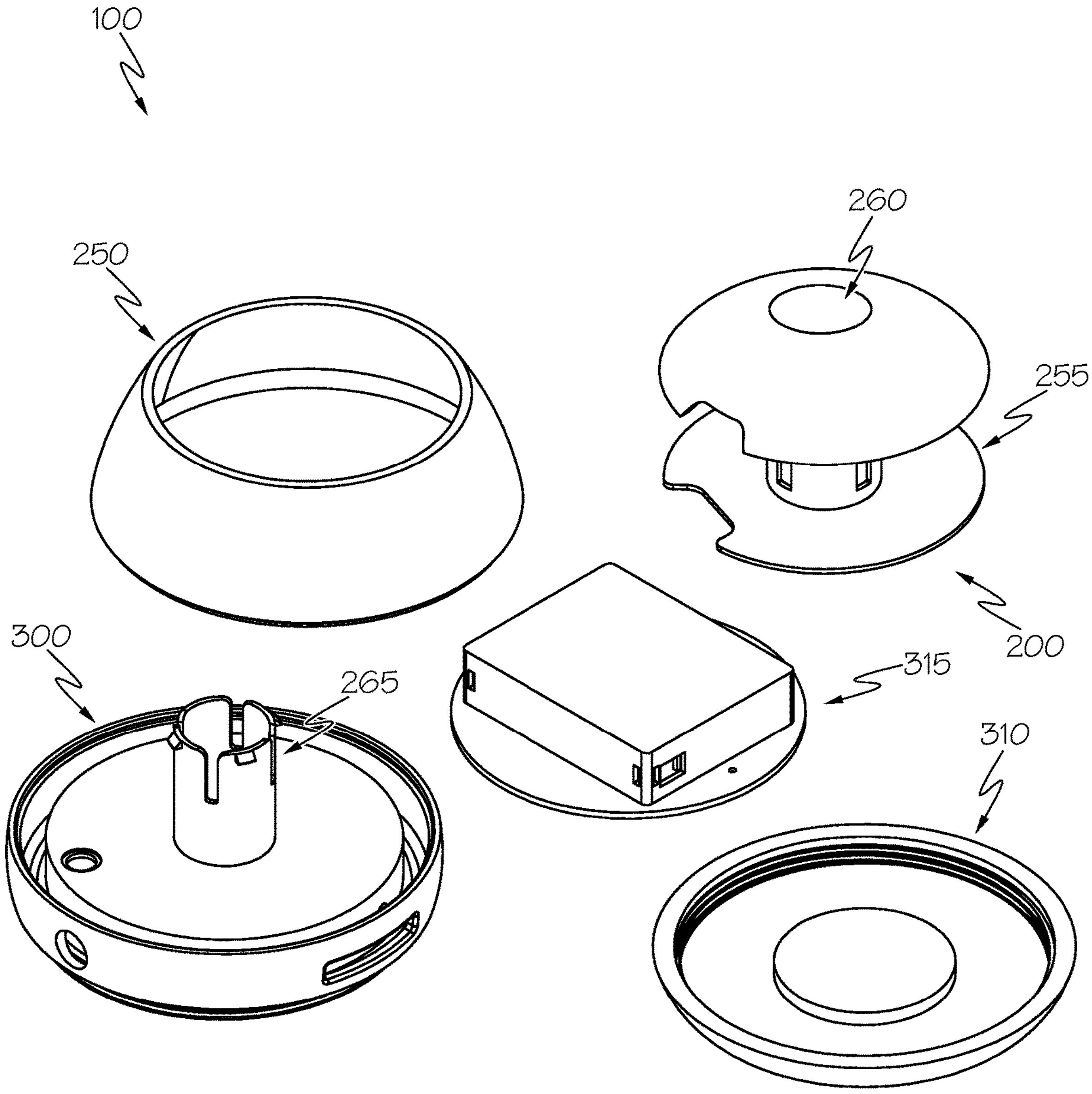
FIG. 12 depicts a component view of the second spooled illumination device, according to one or more embodiments shown and described herein.
Figure 13:
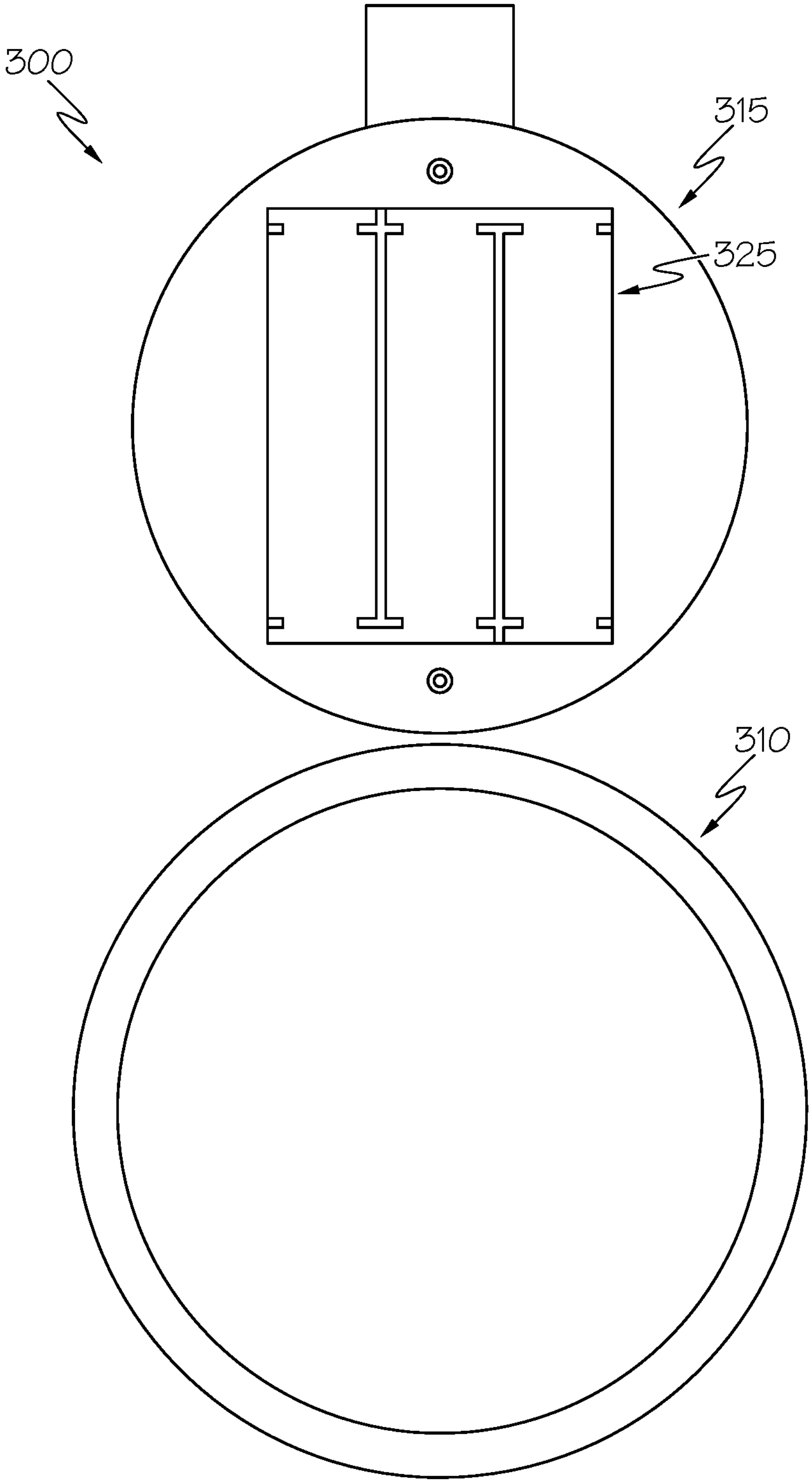
FIG. 13 depicts a bottom view of the second spooled illumination device, according to one or more embodiments shown and described herein.

Turning to FIG. 12, individual components of the second spooled illumination device 100 are depicted. The spool 255 is generally cylindrical and has an opening 260 that extends through the middle. The opening 260 is configured to fit around a protruding portion 265 of the bottom portion 300. The protruding portion 265 may have one or more engagement features that prevent the spool 255 from being completely separated from the protruding portion 265 when it is lifted along with the top 200. Additionally, the bottom 300 further includes a base 310 that when matted with the bottom 300 encloses a battery compartment 315 and electronics for powering and controlling illumination of the rope light 30. FIG. 13 depicts an illustrative bottom view of the bottom 300, the base 310 and the battery compartment 315 having batteries 325 disposed therein.

Implementation examples are described in the following numbered clauses:

An illumination device comprises a spool body, a rope light selectively wrapped around the spool body, and a power source disposed with the spool body and electrically coupled to the rope light such that the power source causes the rope light to emit light.

The illumination device of any preceding clause, wherein the spool body comprises a top flange extending from a perimeter of a first end of the spool body and a bottom flange extending from a perimeter of a second end of the spool body opposite the first end of the spool body, wherein the rope light is selectively spooled around the spool body between the top flange and the bottom flange.

The illumination device of any preceding clause, wherein the top flange comprises one or more slots configured to receive and retain a portion of the rope light.

The illumination device of any preceding clause, wherein the bottom flange comprises one or more slots configured to receive and retain a portion of the rope light.

The illumination device of any preceding clause, wherein the top flange and the bottom flange each comprise one or more slots configured to receive and retain a portion of the rope light.

The illumination device of any preceding clause, wherein a first end of the rope light couples to the spool body and a second end of the rope light comprises an attachment means.

The illumination device of any preceding clause, wherein the attachment means comprises a hook, the hook is sized to receive a section of the rope light.

The illumination device of any preceding clause, wherein the spool body comprises a first end and a second end opposite the first end, at least one of the first end or the second end comprises an attachment means having a hole integrally formed with the at least one of the first end or the second end for receiving a fastening device.

The illumination device of any preceding clause, wherein the fastening device comprises a carabineer, a rope, or other device for connecting the spool body to an object.

The illumination device of any preceding clause, wherein the rope light comprises a plurality of illumination sources spaced apart and electrically coupled together by one or more wires, the plurality of illumination sources are woven into or embedded within a length of rope material.

The illumination device of any preceding clause, further comprising a circuitry component disposed within the spool body, the circuitry component configured to electrically couple the power source to the rope light and control an illumination of the rope light.

The illumination device of any preceding clause, wherein the power source comprises one or more primary batteries.

The illumination device of any preceding clause, wherein the circuitry component comprises a button, the button being actuatable by a user.

The illumination device of any preceding clause, wherein operation of the button causes the rope light to operate in one or more of a plurality of modes comprising: activating the rope light, causing the rope light to cycle through a plurality of colors, causing the rope light to hold the cycling through the plurality of colors on a selected color, or deactivating the rope light.

The illumination device of any preceding clause, wherein operation of the button causes the rope light to operate in one or more of a plurality of modes comprising: activating the rope light, activating the rope light to generate light at one or more different brightness levels through one or more depressions of the switch, causing the rope light to flash, or deactivating the rope light.

An illumination device comprising a rope light comprising a plurality of illumination sources woven into a rope material of the rope light; a spool body comprising a top flange extending from a perimeter of a first end of the spool body and a bottom flange extending from a perimeter of a second end of the spool body opposite the first end of the spool body, wherein the rope light is selectively spooled around the spool body between the top flange and the bottom flange; a plurality of slots disposed with the top flange and the bottom flange, the plurality of slots configured to receive and retain a portion of rope light; and a power source disposed with the spool body and electrically coupled to the rope light such that the power source causes the rope light to emit light.

The illumination device of any preceding clause, further comprising a circuitry component disposed within the spool body, the circuitry component configured to electrically couple the power source to the rope light and control an illumination of the rope light.

The illumination device of any preceding clause, wherein the circuitry component comprises a button, the button being actuatable by a user.

The illumination device of any preceding clause, wherein the power source comprises one or more primary batteries.

The illumination device of any preceding clause, wherein a first end of the rope light couples to the spool body and a second end of the rope light comprises an attachment means, the attachment means comprises a hook, the hook is sized to receive a section of the rope light.

The terminology used herein is for the purpose of describing particular aspects only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "or a combination thereof" means a combination including at least one of the foregoing elements.

It will be apparent to those skilled in the art that various modifications and variations can be made without departing from the spirit or scope of the disclosure. Since modifications, combinations, sub-combinations and variations of the disclosed embodiments incorporating the spirit and substance of the disclosure may occur to persons skilled in the art, the disclosure should be construed to include everything within the scope of the appended claims and their equivalents.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments, but should be defined only in accordance with the following claims and their equivalents.

What is claimed is:

1. An illumination device comprising:

a spool body selectively coupled to a cap, wherein:

the spool body comprises a first portion and a second portion opposite the first portion, the first portion comprising a circular opening with first threads disposed on an internal perimeter of the circular opening, the cap comprises a circular shape and a size corresponding to the circular opening of the spool body, a perimeter of the cap comprises second threads configured to mate with the first threads of the spool body when the spool body and the cap are selectively coupled, and an attachment means comprising a hole oriented perpendicular to a surface of the cap, and the attachment means is integrally formed with the surface of the cap;

a rope light comprising a first end and a second end opposite the first end, with a length of the rope light, extending between the first end and the second end, is selectively wrapped around the spool body;

an attachment device comprising a receiving section formed at a first portion of the attachment device and a hook formed on an opposite portion of the attachment device, wherein:

the hook is an open circle shaped hook, wherein an opening of the open circle shaped hook is sized to receive a portion of the rope light into the hook, and the second end of the rope light is fixed within the receiving section of the attachment device; and a power source disposed within the spool body and electrically coupled to the rope light such that the power source causes the rope light to emit light.

2. The illumination device of claim 1, wherein the rope light comprises:

one or more wires;

a plurality of illumination sources spaced apart and electrically coupled together by the one or more wires; and a length of rope material, wherein the plurality of illumination sources are woven into or embedded within the length of rope material.

3. The illumination device of claim 1, wherein the hole of the attachment means is configured to receive a fastening device.

4. The illumination device of claim 3, wherein the fastening device comprises at least one of a carabineer or a rope for connecting the spool body to an object.

5. The illumination device of claim 1, wherein the spool body comprises a top flange extending from a perimeter of the first portion of the spool body and a bottom flange extending from a perimeter of the second portion of the spool body opposite the first portion of the spool body, wherein the rope light is selectively spooled around the spool body between the top flange and the bottom flange.

6. The illumination device of claim 5, wherein the top flange comprises one or more slots configured to receive and retain the portion of the rope light.

7. The illumination device of claim 5, wherein the bottom flange comprises one or more slots configured to receive and retain the portion of the rope light.

8. The illumination device of claim 5, wherein the top flange and the bottom flange each comprise one or more slots configured to receive and retain the portion of the rope light.

9. The illumination device of claim 1, further comprising a circuitry component disposed within the spool body, the circuitry component configured to electrically couple the power source to the rope light and control an illumination of the rope light.

10. The illumination device of claim 9, wherein the power source comprises one or more batteries.

11. The illumination device of claim 9, wherein the circuitry component comprises a button, the button being actuatable by a user.

12. The illumination device of claim 11, wherein operation of the button causes the rope light to operate in one or more of a plurality of modes comprising:

activating the rope light, causing the rope light to cycle through a plurality of colors, causing the rope light to hold the cycling through the plurality of colors on a selected color, or deactivating the rope light.

13. The illumination device of claim 11, wherein operation of the button causes the rope light to operate in one or more of a plurality of modes comprising:

activating the rope light, activating the rope light to generate light at one or more different brightness levels through one or more depressions of the button, causing the rope light to flash, or deactivating the rope light.

14. An illumination device comprising:

a rope light comprising a rope material and a plurality of illumination sources woven into the rope material;

a spool body comprising a top flange extending from a perimeter of a first end of the spool body and a bottom flange extending from a perimeter of a second end of the spool body opposite the first end of the spool body, wherein: the first end of the spool body comprises a circular opening with first threads disposed on an internal perimeter of the circular opening, and the rope light is selectively spooled around the spool body between the top flange and the bottom flange;

a cap selectively coupled to the first end of the spool body, wherein the cap comprises a circular shape and a size corresponding to the circular opening at the first end of the spool body, a perimeter of the cap comprises second threads configured to mate with the first threads of the spool body when the spool body and the cap are selectively coupled, and an attachment means comprising a hole oriented perpendicular to a surface of the cap, and the attachment means is integrally formed with the surface of the cap a plurality of slots disposed in the top flange and the bottom flange, the plurality of slots configured to receive and retain a portion of rope light;

an attachment device comprising a receiving section formed at a first portion of the attachment device and a hook formed on an opposite portion of the attachment device, wherein:

the hook is an open circle shaped hook, wherein an opening of the open circle shaped hook is sized to receive a portion of the rope light into the hook, and the second end of the rope light is fixed within the receiving section of the attachment device; and a power source disposed with the spool body and electrically coupled to the rope light such that the power source causes the rope light to emit light.

15. The illumination device of claim 14, wherein the power source comprises one or more batteries.

16. The illumination device of claim 14, further comprising a circuitry component disposed within the spool body, the circuitry component configured to electrically couple the power source to the rope light and control an illumination of the rope light.

17. The illumination device of claim 16, wherein the circuitry component comprises a button, the button being actuatable by a user.

* * * * *